US007715469B2

(12) United States Patent
Chuang et al.

(10) Patent No.: US 7,715,469 B2
(45) Date of Patent: *May 11, 2010

(54) LINK ADAPTATION IN WIRELESS NETWORKS FOR THROUGHPUT MAXIMIZATION UNDER RETRANSMISSIONS

(76) Inventors: Justin Che-I Chuang, 15 Bryce Rd., Holmdel, NJ (US) 07733; Xiaoxin Qiu, 1576 Mountain Top Rd., Bridgewater, NJ (US) 08807

( * ) Notice: Subject to any disclaimer, the term of this patent is extended or adjusted under 35 U.S.C. 154(b) by 0 days.

This patent is subject to a terminal disclaimer.

(21) Appl. No.: 12/315,993

(22) Filed: Dec. 9, 2008

(65) Prior Publication Data
US 2009/0103598 A1    Apr. 23, 2009

Related U.S. Application Data

(63) Continuation of application No. 10/970,883, filed on Oct. 22, 2004, now Pat. No. 7,463,677, which is a continuation of application No. 09/370,770, filed on Aug. 9, 1999, now Pat. No. 6,823,005.

(60) Provisional application No. 60/096,006, filed on Aug. 10, 1998.

(51) Int. Cl.
*H04B 17/00* (2006.01)
(52) U.S. Cl. .................. 375/227; 375/346
(58) Field of Classification Search ......... 375/219–222, 375/224, 225, 227, 346, 348
See application file for complete search history.

(56) References Cited

U.S. PATENT DOCUMENTS

| 5,541,955 | A | 7/1996 | Jacobsmeyer |
| 5,909,469 | A | 6/1999 | Frodigh et al. |
| 5,914,959 | A | 6/1999 | Marchetto et al. |
| 6,049,774 | A | 4/2000 | Roy |
| 6,208,663 | B1 | 3/2001 | Schramm et al. |
| 6,823,005 | B1 * | 11/2004 | Chuang et al. ............ 375/227 |
| 7,463,677 | B2 * | 12/2008 | Chuang et al. ............ 375/227 |

OTHER PUBLICATIONS

Furuskar et al, System Performance of EDGE, a Proposal for Enhanced Data Rates in Existing Digital Cellular Systems, IEEE, VTC'98, pp. 1284-1289.

* cited by examiner

*Primary Examiner*—David B Lugo

(57) ABSTRACT

The present invention implements a method and system for dynamically adapting the modulation and coding scheme for radio links in a wireless communications network based on a retransmission environment model in order to maximize throughput and most efficiently allocate bandwidth resources. The present invention encompasses a refined calculus and methodology for deriving the link adaptation thresholds in a retransmission environment using a complex model and analysis of the retransmission environment. The present invention holds particular application for wireless data communications as opposed to real time data services because it is based on a retransmission model applicable primarily for data services. A critical component of this new link adaptation system is a "no transmission" cutoff mode that is selected for SIR below a base threshold value. This new mode prevents system instability and misallocation of bandwidth in a wireless communication system.

6 Claims, 8 Drawing Sheets

TIME 710

SIR > CUTOFF THRESHOLD

TIME 720

SIR < CUTOFF THRESHOLD

TIME 730

SIR > CUTOFF THRESHOLD

LINK ADAPTATION IN WIRELESS NETWORKS FOR THROUGHPUT MAXIMIZATION UNDER RETRANSMISSIONS

PRIOR PROVISIONAL PATENT APPLICATION

This application is a Continuation application of Ser. No. 10/970,883, filed Oct. 22, 2004, now U.S. Pat. No. 7,463,677, issued Dec. 9, 2008, which is a continuation application of Ser. No. 09/370,770, filed Aug 9, 1999, now U.S. Pat. No. 6,823,005, issued Nov. 23, 2004, which claims the benefit under 35 USC 119(e) of U.S. Provisional Application 60/096,006, filed Aug. 10, 1998.

FIELD OF THE INVENTION

The present invention relates generally to wireless communications systems. In particular, the invention concerns a dynamic link adaptation process that offers increased throughput and bandwidth allocation efficiency with particular benefit for wireless data services.

BACKGROUND INFORMATION

Interest in wireless data communications has grown rapidly in the past few years due to the growth of the Internet. The nature of the data carried over a wireless network is highly determinative of the type of architecture required for efficient and reliable communications. The key to meeting the increasing demand for wireless services is the development of high performance radio systems that take the unique features of the data traffic into account. For example, the architecture of a real time communications system carrying voice and/or video diverges greatly from the design considerations for data communications systems. Compared to voice and other real-time traffic, data traffic usually has a minimum tolerance for transmission errors and a high tolerance of transmission delay. As a result, packet retransmissions are possible and often necessary. For data applications, the techniques of packet switching, dynamic resource assignment and link adaptation are more suitable than conventional techniques such as circuit switching, fixed resource allocation and fixed transmission schemes.

The need for re-engineering of communications systems in order to accommodate the needs of data traffic has been recognized. For example, several existing systems, such as Cellular Digital Packet Data (CDPD), Global System for Mobile Communication (GSM) and IS-136 have the capacity to support data services. However, these systems employ circuit switching (except for CDPD) and offer only low data rates. Currently, the data rate of GSM ranges from 2.4 kbps to 9.6 kbps. To enhance the data capability of GSM, a new service called the General Packet Radio Service (GPRS) has been proposed. In addition, the European Telecommunications Standards Institute (ETSI) has standardized a specification entitled Enhanced Data Rates for GSM Evolution (EDGE) as an attractive GSM evolution for providing broadband data services. Both EDGE and IS-136 utilize link adaptation in order to maximize throughput and promote bandwidth efficiency.

Link adaptation is a continuous process in which the attributes of each link within a communications system are dynamically updated to maximize throughput (or some other parameter) and efficiently utilize the available bandwidth according to a set of criteria. Typically, a link adaptation scheme consists of a set of modes each incorporating a different modulation/coding scheme or some other link parameter controlling the data rate. Each mode and corresponding modulation/coding scheme has an associated set of performance attributes. For example, the block error rate (BLER) is an important parameter in a link adaptation system. BLER is the probability that a block of bits transmitted from the receiver to the transmitter contains an error after decoding. BLER is a function of the signal-to-interference ratio (SIR) (ratio of signal to interference power) at the receiver such that each mode has a characteristic BLER curve as a function of SIR. Each modulation/coding scheme is also associated with a radio interface rate R, which is the actual rate of information transmission after accounting for the coding overhead. Using the performance attributes BLER and R for each mode, the throughput (measure of the actual bit transmission rate from transmitter to receiver) for each mode can be described as a function of SIR.

Link adaptation is accomplished by establishing a set of threshold values for choosing different transmission modes. These threshold values are used to determine the selection of each mode in the adaptation scheme based on some real time performance measure such as SIR. A link adaptation system operates by periodically taking a real time performance measure for each link (e.g., SIR at the receiver), comparing this performance measure with the threshold values for the modes and then selecting the appropriate mode that will maximize throughput.

The appropriate link adaptation threshold scheme is crucial to realize performance gains. If the thresholds are too aggressive, i.e., users with poor link quality select higher level modulation/coding schemes, the overall system performance will suffer due to excessive retransmissions. On the other hand, if these thresholds are too conservative, the system performance will also suffer due to low spectrum efficiency, which results in prolonged resource occupancy.

Traditional link adaptation schemes use BLER as a basis for establishing the set of adaptation thresholds. Usually the modulation/coding scheme is updated to maintain the BLER at a particular level, (e.g. 10%). Thus, the BLER establishes an acceptable level of error for a communications channel, which is appropriate for real time traffic. On the other hand, data services allow the retransmission of blocks in error at the cost of delay. Therefore, BLER is generally not the only criterion for data services since the ultimate measure for data services is throughput. The throughput depends upon BLER, the transmission rate and the possibility of retransmissions.

Link adaptation systems for data services typically rely upon throughput criteria to select the appropriate adaptation mode. For example, the central technology of EDGE is a link adaptation scheme that dynamically adapts the modulation/coding scheme according to the current link quality to maximize system throughput. EDGE incorporates two different modulation schemes, Offset Quadrature Phase Shift Keying (OQPSK) and Offset 16 Quadrature Amplitude Modulation (O16QAM). Combining these two different modulation schemes with four different coding schemes, EDGE supports a total of eight possible modulation/coding modes.

The set of thresholds comprising a link adaptation system is derived from a mathematical model of the wireless environment and the performance attributes for each modulation/coding mode. The choice of an appropriate wireless environment model is critical for establishing the correct link adaptation thresholds. For example, conventional link adaptation schemes such as EDGE are based on a model of a no-retransmission environment that assumes erroneous packets are discarded and do not increase the load in a system (i.e., packets are not retransmitted if lost or damaged in the transmission process).

However, retransmissions are in fact necessary for wireless data services and the behavior of a retransmission environment diverges significantly from a no-retransmission environment. In particular, a retransmission environment produces highly complex feedback behavior that can result in system instability and degraded performance. Failure to model this complex behavior and derive a correct set of link adaptation thresholds is a major shortcoming of traditional link adaptation schemes and can result in significantly degraded system performance and instability in the retransmission environment.

For example, retransmissions necessarily increase the load on the system, increase interference and lower the SIR. The lowering of the SIR will result in even more retransmissions until either the system reaches a steady state condition if it exists or the system becomes unstable. Thus, neglecting retransmissions significantly underestimates the interference in a wireless communications system and link adaptation schemes designed without considering retransmissions will perform poorly.

SUMMARY OF THE INVENTION

The present invention implements a method and system for dynamically adapting the modulation and coding scheme for radio links in a wireless communications network based on a retransmission environment model in order to maximize throughput and most efficiently allocate bandwidth resources. The present invention encompasses a refined calculus and methodology for deriving the link adaptation thresholds in a retransmission environment using a complex model and analysis of the retransmission environment. The present invention holds particular application for wireless data communications as opposed to real time data services because it is based on a retransmission model applicable primarily for data services. A critical component of this new link adaptation system is a "no transmission" cutoff mode that is selected for SIR below a base threshold value. This new mode prevents system instability and misallocation of bandwidth in a wireless communication system.

DETAILED DESCRIPTION

Figure 1:
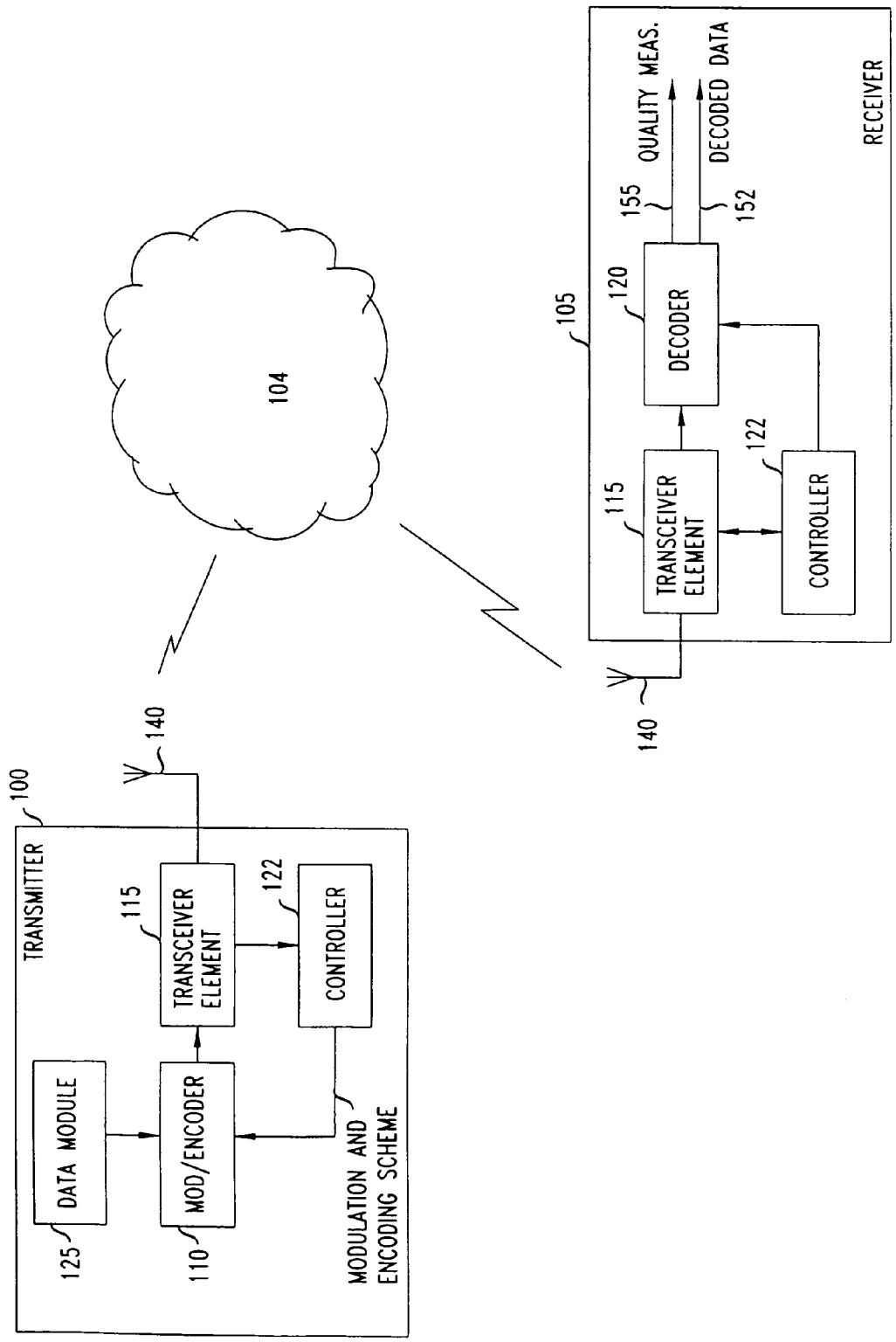
FIG. 1 depicts the large-scale architecture of a wireless communications system according to one embodiment of the present invention.

The present invention is based upon an analysis of link adaptation within a retransmission environment. The present invention departs significantly from traditional link adaptation schemes for wireless data services, which neglect retransmissions and ultimately produce an erroneous link adaptation framework that produces instability, misallocation of bandwidth and poor system performance.

The retransmission model underlying the present invention generated two critical discoveries that significantly shaped the present invention. First, the threshold values for a link adaptation system using a retransmission model can be derived from the no-retransmission model thresholds. The retransmission thresholds are obtained by shifting the throughput characteristic curves for the no-retransmission model by an amount relating to the difference between the signal to interference ratio generated by the base offered traffic, $SIR_0$, and the resulting signal-to-interference ratio generated due to the base traffic plus retransmissions, SIR.

Second, the retransmission model revealed that there should be no transmission at all below a base threshold SIR (referred to herein as the "no-transmission" or "mode 0" threshold). Transmitting below this "no-transmission" threshold produces system instability such that excessive retransmissions result causing unbounded delay and almost zero throughput at the receiver. This instability is a product of the retransmission environment itself and is not analyzed or accounted for in conventional link adaptation systems. The complex analysis and insights underlying the retransmission model are an essential underpinning of the present invention and are outlined below. This analysis was summarized from J. Chuang, X. Qiu, "An Improved Link Adaptation Algorithm and Its Implementation Requirements", presented at SMG2 EDGE ad hoc on EDGE physical/link layer issues in London, Aug. 12-13, 1998, and "Link Adaptation in Wireless Data Networks for Throughput Maximization Under Retransmissions, AT&T Technical Memorandum, HA6132000-980714-06TM, July 1998, also submitted to IEEE ICC'99, Jun. 6-10, 1999.

In one embodiment of the present invention, the retransmission model was derived and analyzed using the modulation/coding schemes outlined in EDGE. However, this analysis would apply to any modulation/coding framework. Thus, link adaptation threshold values in a retransmission environment for any modulation/coding architecture can be derived using the framework outlined herein. Recently, for example, new modulation schemes were proposed, and the methodology outlined herein can be applied to them. Furthermore, this same embodiment relied primarily upon an infinite retransmission model, an assumption that packets would be retransmitted until success. However, the basic analysis presented herein can be used for a retransmission model based upon any arbitrary number of retransmissions (e.g., a one retransmission model or a two retransmissions model).

FIG. 1 depicts the large-scale architecture of a wireless communications system according to one embodiment of the present invention. Transmitter 100 communicates with receiver 105 through communications channel 104. Transmitter 100 contains transceiver 115, data module 125, modulator/encoder 110, controller 122 and antenna 140. Controller 122 calculates modulation/encoding scheme 150 from quality measure 155 sent from receiver 105 and transmits this information to modulator/encoder 110. Modulation/encoding scheme 150 is used by modulator/encoder 110 to modulate and encode data retrieved from data module 125. The modulated/encoded data is sent to transceiver 115 for transmission through antenna 140 onto communications channel 104. Receiver 105 contains decoder 120, controller 122, transceiver 115 and antenna 140. Transceiver 115 is coupled to antenna 140 and communications channel 104 from which data is received. Data is sent from transceiver 115 to decoder 120, which is controlled by controller 122. Decoder 120 outputs decoded data 152 and quality measure 155, which might for example be the current BLER or SIR at the receiver. Quality measure 155 is transmitted back to transmitter 100 through communications channel 104.

Figure 2:
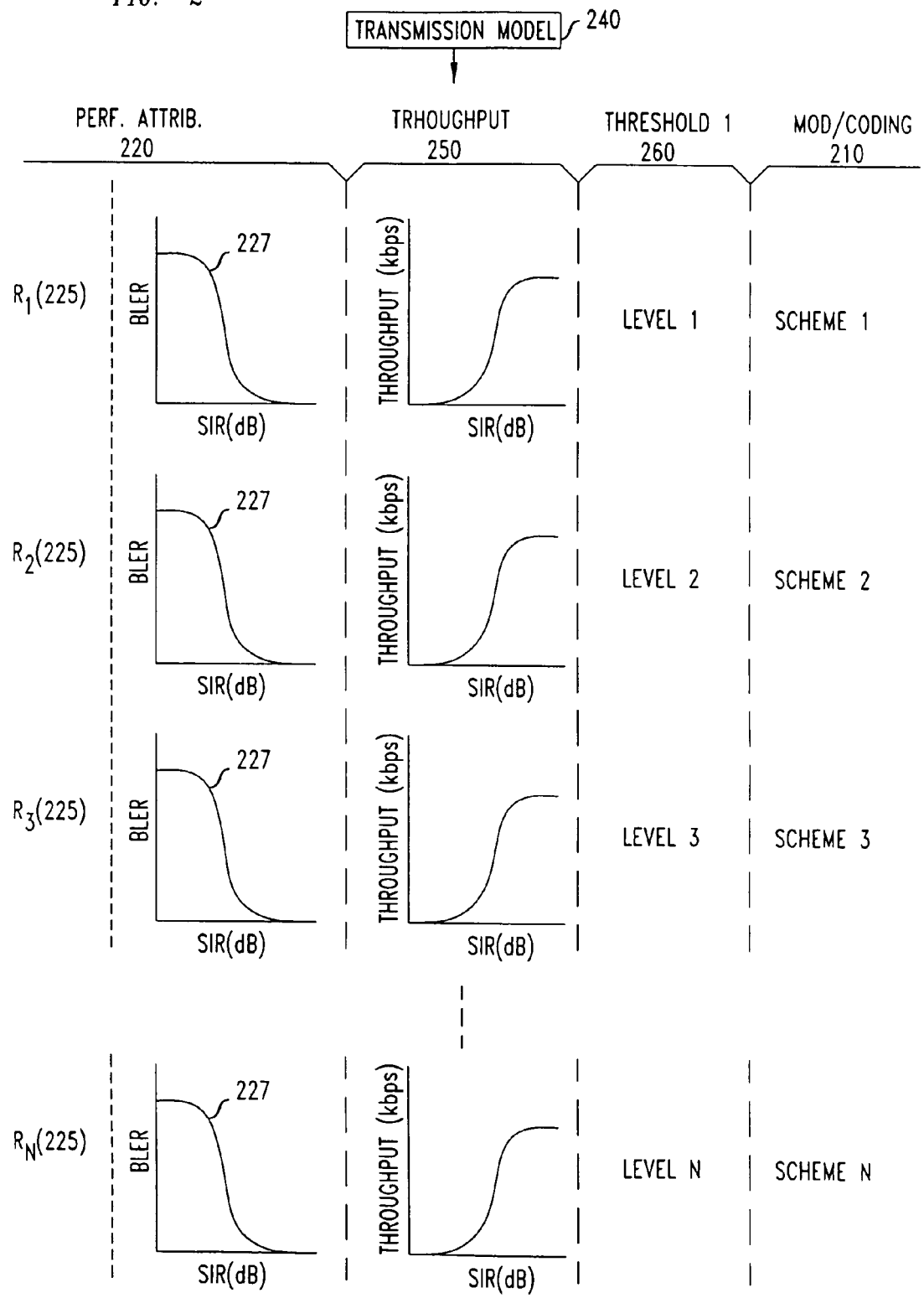
FIG. 2 depicts the architecture of a link adaptation system consisting of a set N of modulation/coding schemes according to one embodiment of the present invention.
Figure 3:
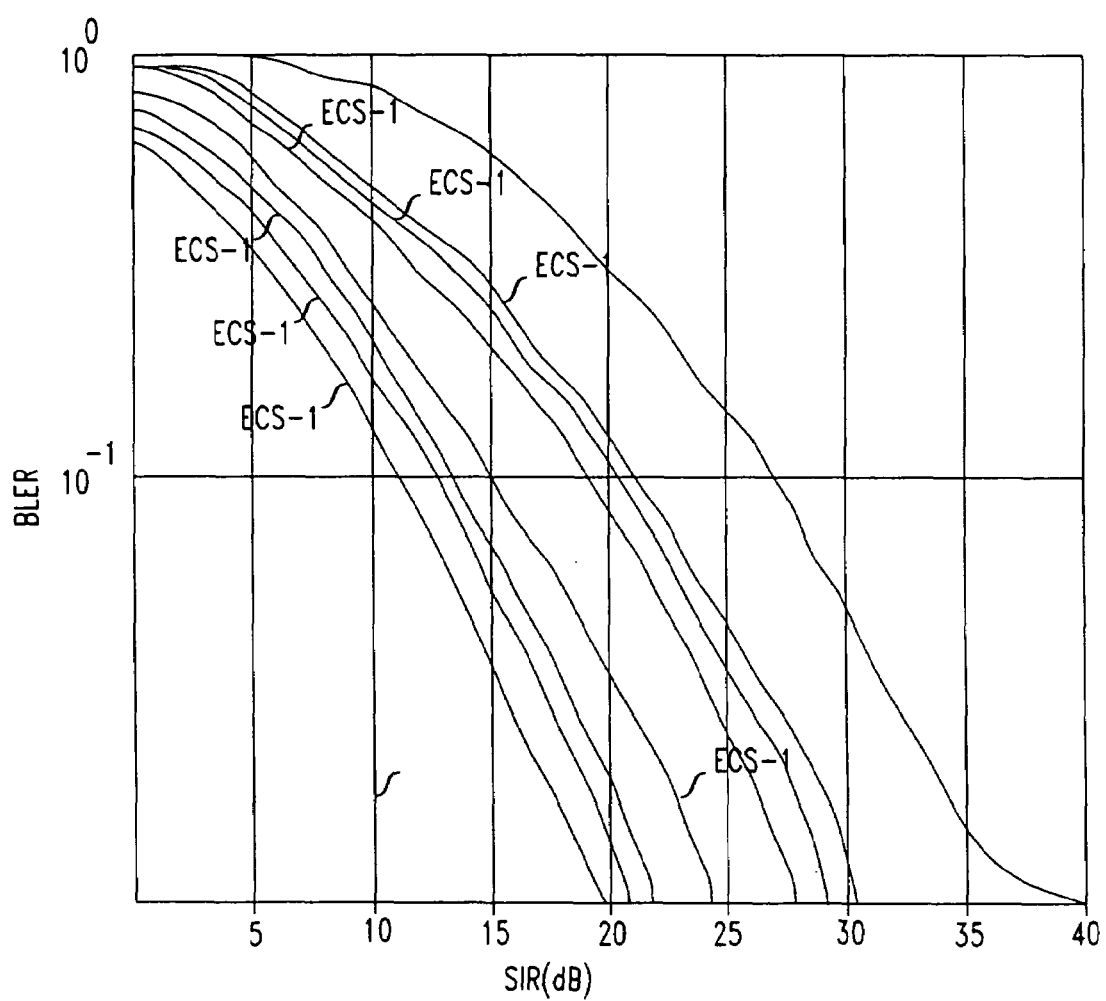
FIG. 3 depicts BLER as a function of SIR for the eight transmission modes in EDGE.

FIG. 2 depicts the architecture of a link adaptation system consisting of a set N of modulation/coding schemes 210 according to one embodiment of the present invention. Each scheme n∈N (210) is characterized by a set of performance attributes 220 that may include, for example, the radio interference rate $R_n$ 225 and $BLER_n$ characteristic 227 where n∈N depicts the particular link adaptation mode 210. $BLER_n$ characteristic 227 is a function relating the BLER to the SIR at the receiver 105 for each mode 210. For example, FIG. 3 depicts BLER as a function of SIR for the eight transmission modes 210 in EDGE. A wireless transmission model 240 is associated with the entire link adaptation scheme and is used to derive a throughput characteristic 250 as a function of SIR for each mode 210. A threshold level 260 is derived for each mode 210 from the set of throughput characteristics 250 in the link adaptation system. For each mode 210, the threshold level 260 corresponds to the range of SIR over which that mode 210 produces the highest throughput among all modes 210 in the link adaptation scheme. The set of threshold values 260 dictate the selection of a mode 210 based upon real-time measurement of the SIR at the receiver 105.

Analysis of the Infinite Retransmission Model

The wireless environment model 240, which comprises a mathematical and conceptual framework for the wireless transmission environment, is a critical component in determining the set of threshold values 260 for each mode 210. The throughput characteristic 250 of each mode 210 is derived from wireless environment model 240 and the performance attributes 220 unique to each mode (i.e. $R_n$ and $BLER_n$ characteristic where n∈N). For example, using a no-retransmission environment model, the throughput S is equal to the probability that a block is transmitted correctly ($1-BLER_n$) multiplied by the actual data transmission $R_n$ $$S_n^0 = R_n(1-BLER_n(SIR_0)) \qquad (1)$$

where $SIR_0$ is the signal-to-interference ratio for the base offered traffic of the system without taking into account any retransmissions. Based upon the no-retransmission environment model 240 as codified in equation (1) and the BLER/SIR relationship depicted in FIG. 3, FIG. 4 depicts a set curves relating the $SIR_0$ for the offered traffic to the throughput for each mode 210 using the EDGE modulation/coding architecture.

Figure 4:
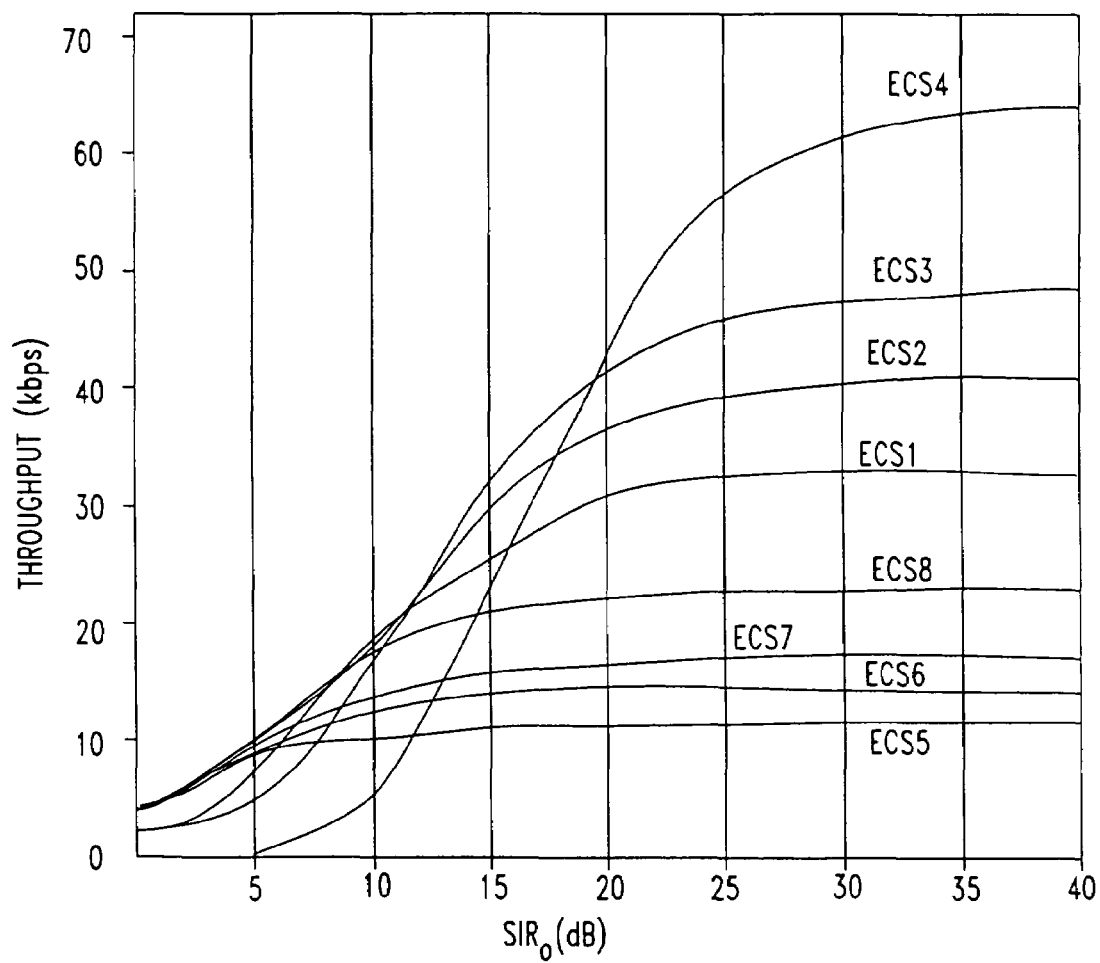
FIG. 4 depicts a set of curves relating the $SIR_0$ for the offered traffic to the throughput for each mode using the EDGE modulation/coding architecture according to one embodiment of the present invention.

However, the curves depicted in FIG. 4 are erroneous in a retransmission environment (such as that required for data services). In fact, using such a link adaptation scheme in a retransmission environment will actually reduce system performance and result in instability in the system. For example, in EDGE, in the range of SIR for which ECS-6 is chosen, the average BLER is higher than 65%, meaning that 65% of packets require retransmission. As a result of this BLER, the load in the system and the interference in the system will be increased substantially. The increase of interference will further lower the SIR and cause even more retransmissions until either the system reaches the steady state if it exists, or the system becomes unstable resulting in a throughput of zero.

The realization that the traditional no-retransmission model 240 could not adequately capture the behavior of the retransmission environment led to a complex and detailed analysis of an infinite retransmission environment underlying the present invention. To develop a conceptual and mathematical model to account for infinite retransmissions required analysis of the traffic load in a communications system operating in a retransmission environment. $\rho_0$ represents the average offered traffic in the communications system neglecting retransmissions. However, the actual load in a transmission system will be higher, represented by $\rho$, the amount of traffic in the system including base offered traffic and retransmission traffic.

Thus, the total load considering retransmissions $\rho$ will be the offered load $\rho_0$ plus the amount of traffic generated by retransmissions. $p_n$ represents the probability of using a particular modulation/coding mode n∈N, where $\Sigma_{n \in N} p_n = 1$. For the first retransmission, the additional traffic will be the offered traffic $\rho_0$ multiplied by the probability of choosing mode n (n∈N) 210 multiplied by the BLER for mode n 210 summed over all modes n (n∈N) 210. The same relationship will apply for the second retransmission except that the BLER term will be of second order due to the two retransmissions. If a user does not change the modulation/coding scheme until the current packet is successfully transmitted, in the steady state, the load in the transmission system under the assumption of infinite retransmissions is given generally by:

$$\rho = \rho_0 + \sum_{n \in N} (\rho_0 p_n) \cdot BLER_n + \sum_{n \in N} (\rho_0 p_n) \cdot BLER_n^2 + \cdots \qquad (2)$$

Simplification yields:

$$\sum_{n \in N} \frac{\rho_0 p_n}{1 - BLER_n} \qquad (3)$$

where $BLER_n$ is a function of SIR.

Using a first order approximation, assuming that the total interference I is a linear function of the load $\rho$, the interference can be described as:

$$I = \sum_{n \in N} \frac{I_0 p_n}{1 - BLER_n} \qquad (4)$$

where $I_0$ is the interference at the receiver 105 if erroneous packets are discarded (i.e., no retransmissions). Therefore, in the steady state, the SIR at a particular link is:

$$SIR = \frac{SIR_0}{\sum_{n \in N} \frac{p_n}{1 - BLER_n}} \qquad (5)$$

where $SIR_0$ is the SIR at a link receiver 105 without considering retransmissions. Expressed in dB, the SIR at the receiver 105 is:

$$SIR|_{dB} = SIR_0|_{dB} - 10 \log\left(\sum_{n \in N} \frac{p_n}{1 - BLER_n}\right) \quad (6)$$

Thus, the SIR at the receiver 105 is the SIR of the offered traffic (i.e. without retransmissions) plus an additional factor $C(\rho)$ (herein referred to as the "SIR margin") corresponding to a reduction in SIR at each receiver link 105 due to retransmissions $$SIR|_{dB} = SIR_0|_{dB} + C(\rho) \text{ where:} \quad (7)$$

$$C(\rho) = -10 \log\left(\sum_{n \in N} \frac{p_n}{1 - BLER_n}\right) \quad (8)$$

Relating equation (1) to the preceding analysis, in the steady state, the throughput using the infinite retransmission model 240 is:

$$S_n^s = R_n(1 - BLER_n(SIR_0 + C(\rho))) \quad (9)$$

According to one embodiment of the present invention, the determination of $C(\rho)$ was simplified by making the assumption that all users in the system use the same modulation/coding scheme n (n∈N) 210, i.e., $p_n=1$, when the SIR margin of mode n (n∈N) 210 is considered. Without this assumption, evaluation of $C(\rho)$ proved to be highly complex since $C(\rho)$ is a function of both $\{p_n\}$ and $\{BLER_n\}$ where $\{p_n\}$ is a function of the offered load $\rho_0$ and many other parameters such as the propagation environment. Using this analysis, the determination of the SIR margin was greatly simplified since $C(\rho)$ is reduced to a function of $BLER_n$ alone which itself is a function of SIR (see FIG. 3). Predictions based upon this assumption have corresponded very closely with measured experimental results. Thus, using the assumption that interaction between different modes can be decoupled, the SIR at each receiver link 105 is:

$$SIR|_{dB} = SIR_0|_{dB} + 10 \log(1 - BLER_n) \text{ where} \quad (10)$$

$$C(\rho) = 10 \log(1 - BLER_n) \quad (11)$$

Method for Deriving Threshold Values for Infinite Retransmission Model

Assuming that there is a well defined $BLER_n$ characteristic for a given mode 210 and provided with $SIR_0$, SIR and $C(\rho)$ can be obtained analytically by solving equation (10). According to one embodiment of the present invention, the following steps describe a method to evaluate $C(\rho)$:

1. For different values of $SIR_0$, the curves $y=SIR_0+C(\rho)$ and $y=SIR$ are plotted as a function of SIR.
2. For a given value of $SIR_0$, the intersection of the curves $y=SIR_0+C(\rho)$ and $y=SIR$ yields the SIR that satisfies equation (10). The SIR margin can then be calculated as:

$$C(\rho) = SIR - SIR_0.$$

3. If $y=SIR_0+C(\rho)$ and $y=SIR$ do not intersect for a given $SIR_0$, then there is no SIR that satisfies Equation (10) and the system is not stable under this offered load.

Figure 5:
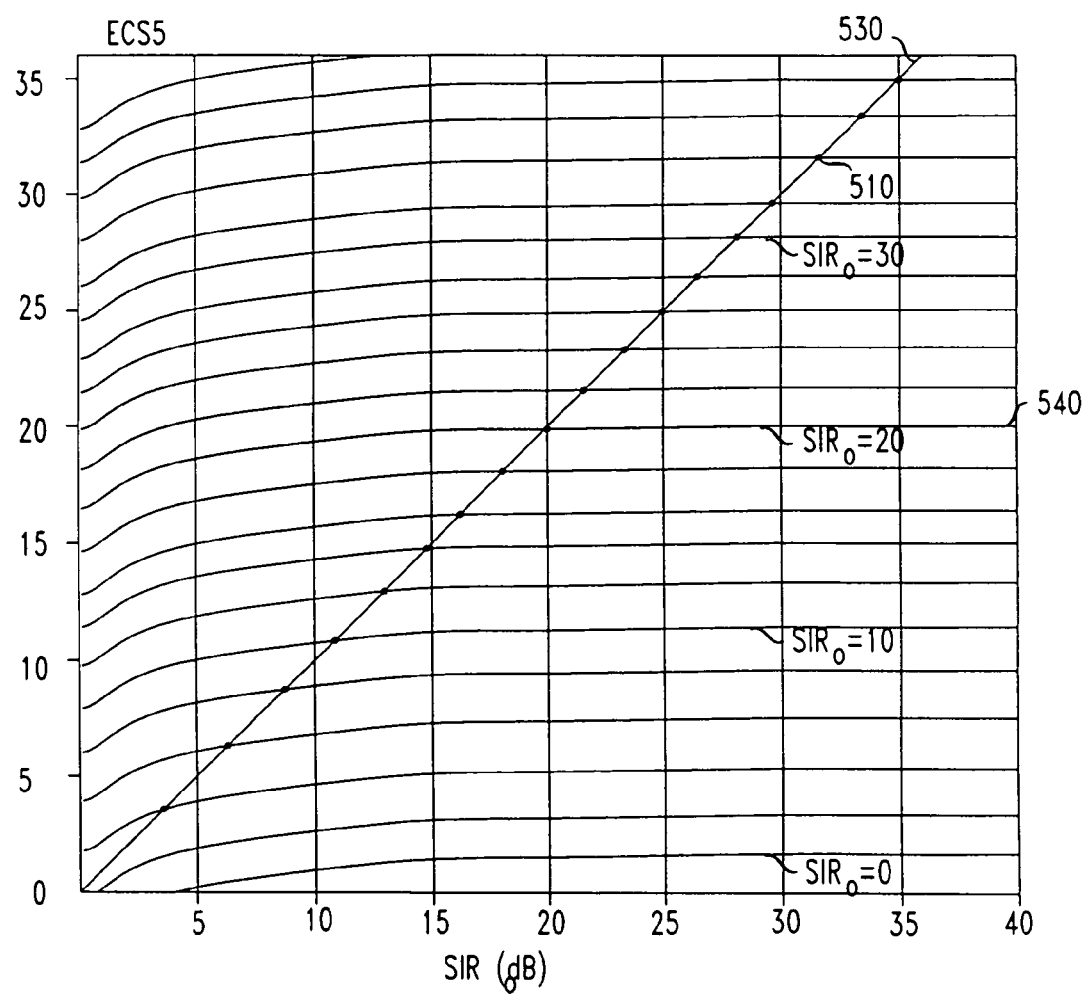
FIG. 5 depicts an example of the determination of a SIR margin for EDGE mode ECS-5 according to one embodiment of the present invention.

FIG. 5 depicts an example of the determination of $C(\rho)$ using the above steps for EDGE mode ECS-5 (210). Points of intersection (510) of the line $y=SIR$ (530) and $y=SIR_0+C(\rho)$ (540) represent stable solutions for the infinite retransmission model 240. $C(\rho)$ can be calculated by finding the difference between SIR and $SIR_0$ at any of these intersection points. For instance, following the steps outlined above, based upon the data in FIG. 5, $C(\rho)$ is approximately −2 dB for $SIR_0$=6 dB.

Once $C(\rho)$ is calculated according to the above-mentioned steps, it is possible to calculate the threshold values 260 for a link adaptation system based upon an infinite transmission model 240 by simply shifting the throughput characteristic curves 250 derived for the no-retransmission model 240 (e.g., FIG. 4). This is evident from Equation (9) which is of the same form as Equation (1) except for the additional term $C(\rho)$, the amount by which SIR is reduced due to retransmissions ($C(\rho)=SIR-SIR_0$). Therefore, the thresholds for the no-retransmission model 240 should be increased approximately by $-C(\rho)$ in order to obtain the thresholds for the infinite transmission model 240.

Figure 6:
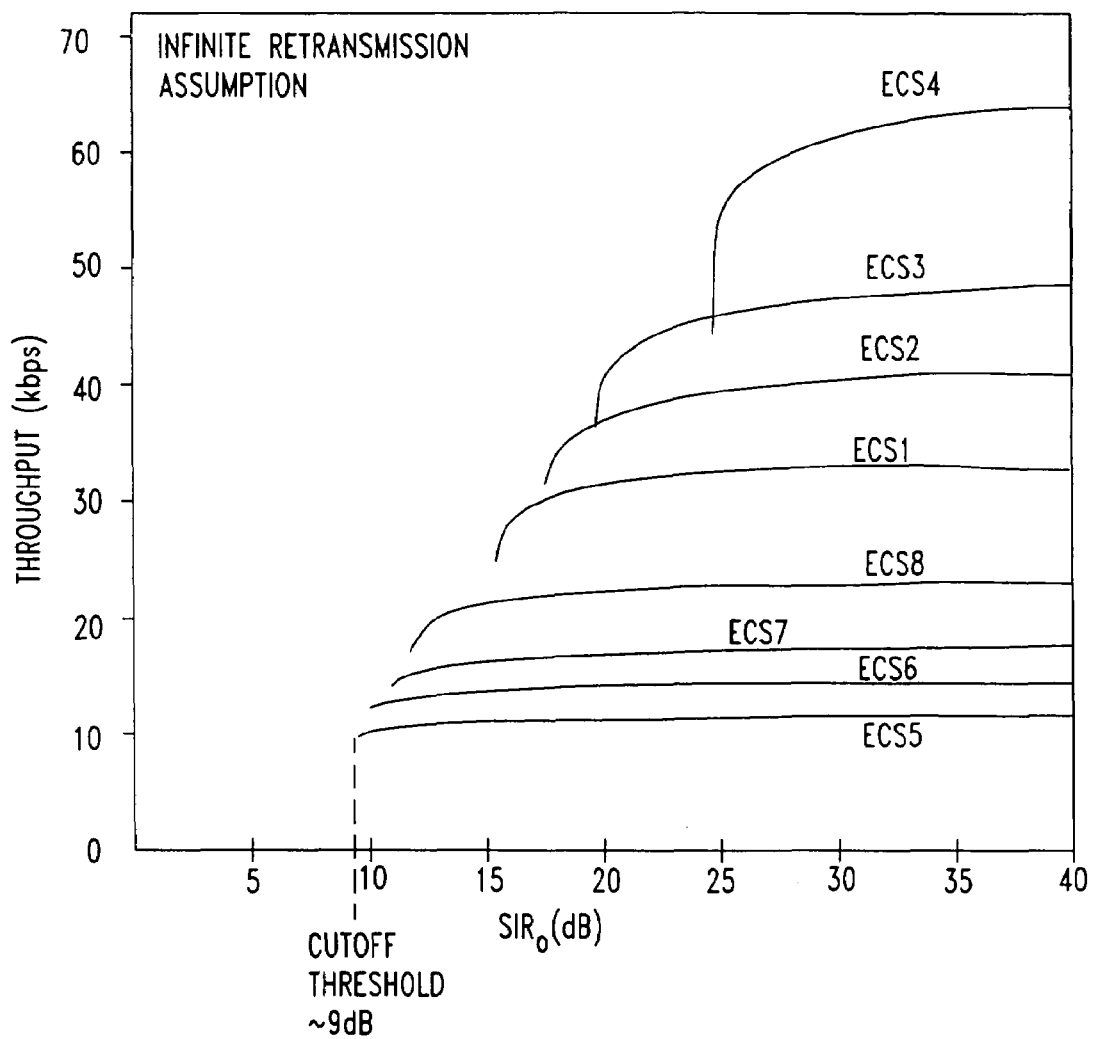
FIG. 6 depicts the derived throughput characteristics for the EDGE modes using an infinite retransmission model.

FIG. 6 depicts the derived throughput characteristics for the EDGE modes 210 using the infinite retransmission model 240 as outlined herein. The threshold values for this infinite retransmission model are obtained by finding the mode 210 that produces the highest throughput over the entire SIR range. As described earlier, other retransmission models such as one-retransmission or two-retransmissions can be analyzed using a similar framework. See J. Chuang, X. Qiu, "An Improved Link Adaptation Algorithm and Its Implementation Requirements", presented at SMG2 EDGE ad hoc on EDGE physical/link layer issues in London, Aug. 12-13, 1998, and "Link Adaptation in Wireless Data Networks for Throughput Maximization Under Retransmissions", AT&T Technical Memorandum, HA6132000-980714-06TM, July 1998, also submitted to IEEE ICC'99, Jun. 6-10, 1999.

Analysis of the infinite retransmission model produced a further critical discovery that in a retransmission environment there exists a cutoff $SIR_0$, below which there should be no transmissions at a transmitter 100. If a transmitter 100 is operating with SIR below this cutoff threshold, transmitting will result in system instability, close to zero throughput and waste of bandwidth resources. For example, an examination of FIG. 5 reveals that there is no stable solution for Equation (9) if $SIR_0$ is below approximately 4 dB. This is apparent by noting that none of the curves $y=SIR_0+C(\rho)$ (540) below $SIR_0$=4 dB (marked with 'x') intersect the line $y=SIR$ (530). Because SIR is a function of $SIR_0$, this means that there is a minimum SIR threshold 260 below which system behavior will become unstable. For example, for the 4 dB value of $SIR_0$ from FIG. 5, the corresponding minimum SIR threshold 260 was determined to be approximately 9 dB (see FIG. 6 (610)).

The discovery of this minimum SIR threshold 260 led to a new no-transmission mode (or mode 0) for link adaptation systems. This mode 0 (cutoff threshold) is the SIR level at a link receiver 105 below which transmission should cease at the corresponding transmitter 100. If transmissions continued below the mode 0 threshold 260, system instability and near zero throughput would result at the link receiver 105. Thus, transmitting below mode 0 wastes bandwidth and system resources and produces near zero throughput. This no-transmission mode is different from conventional admission control, which is performed only once upon admitting a user. Mode 0 is part of the continuous link adaptation process.

Figure 7:
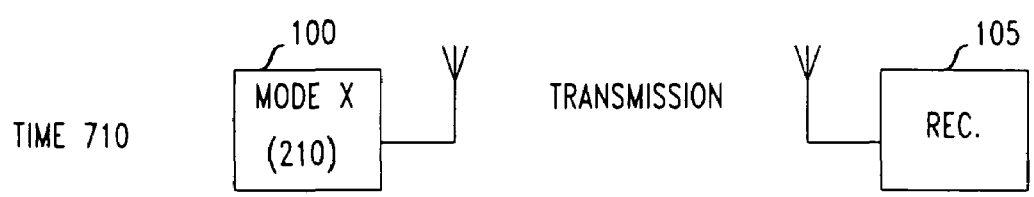
FIG. 7 depicts the operation of a no-transmission mode (mode 0) according to one embodiment of the present invention.
Figure 7:
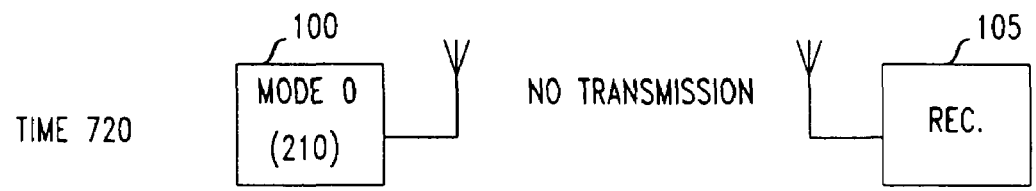
Figure 7:
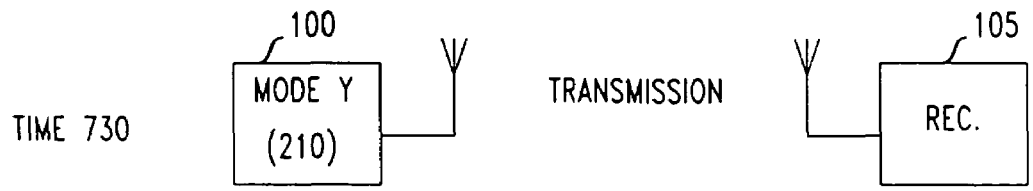

FIG. 7 depicts the operation of a no-transmission mode (mode 0) according to one embodiment of the present invention. At time 710, the SIR at the link receiver 105 exceeds the cutoff threshold. Thus, at time 710, the corresponding transmitter 100 is transmitting using the appropriate mode X 210 for the current SIR in the link adaptation system. At time 720, the SIR at link receiver 105 falls below the cutoff threshold and the transmitter 100 enters mode 0 ending transmission. At time 730, however, the SIR at link receiver 105 again exceeds the mode 0 cutoff threshold and the transmitter 100 begins transmitting using the appropriate mode Y 210 for the current SIR.

Figure 8:
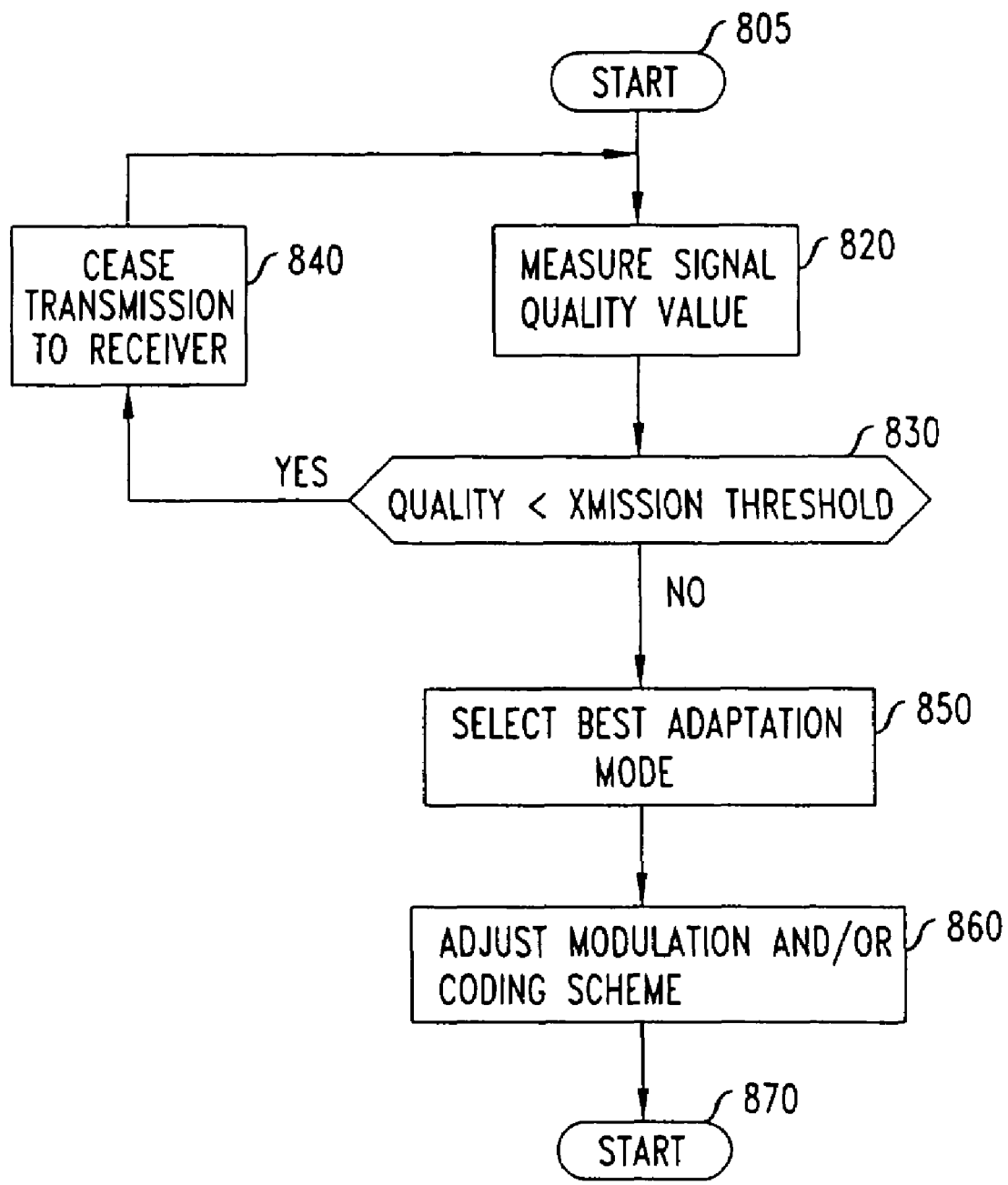
FIG. 8 is a flowchart that depicts a set of steps that may be implemented at a wireless transmitter to utilize a no-transmission mode and perform link adaptation according to one embodiment of the present invention.

FIG. 8 is a flowchart that depicts a set of steps that may be implemented at a wireless transmitter to utilize a no-transmission mode and perform link adaptation according to one embodiment of the present invention. In step 805, the procedure is initiated. In step 820, a signal quality value is measured at a receiver. The signal quality value may be a SIR, BLER or any other value corresponding to the suitability of the signal for reception. In step 830, the signal quality value is compared to a no-transmission threshold value. If the signal quality value is less than the no-transmission threshold ('yes' branch of step 830), the receiver ceases transmission to the receiver (step 840). Otherwise ('no' branch of step 830), link adaptation is performed. In particular, in step 850 a best link adaptation mode is selected (e.g., a mode that maximizes some performance measure such as throughput). In step 860, a modulation and/or coding scheme is adjusted at the transmitter to conform to the best link adaptation mode selected in step 850. The procedure ends in step 870.

The invention claimed is:

1. A method for choosing and employing a transmission mode from a set of transmission modes between a transmitting unit and a receiving unit when retransmissions are employed for signals that are not properly received, comprising the steps of:
   a) deriving throughput characteristics as a funtion of a chosen real-time performance measure, using an infinite retransmission model, for said set of transmission modes, relative to transmission medium between said transmitting unit and said receiving unit;
   b) determining real-time performance measure values from said throughput characteristics, which delineate spans of said real-time performance measure values, where in each of said spans a different link adaptation mode provides best throughput, including a real-time performance value (NT value) below which transmission may result in system instabliity;
   c) said receiving unit periodically measuring said real-time performance measure;
   d) selecting a transmission mode based on span of said spans within which said measured real-time performance measure lies;
   e) said transmitting unit adjusting its transmission mode to said receiving unit according to the selected transmission mode; and
   f) the transmitting unit transmitting packets to the receiving unit as long as said measured real-time performance measure is not below said NT value.

2. The method of claim 1 where said real-time performance measure is signal to interference ratio (SIR) values.

3. The method of claim 1 where said real-time performance measure is block error rate values.

4. The method of claim 1 where said transmission mode specifies a particular modulation.

5. The method of claim 1 where said link adaptation mode specifies a coding scheme.

6. The method of claim 1 where said transmission mode specifies both a modulation mode and a coding scheme.

\* \* \* \* \*